UNITED STATES PATENT OFFICE.

HUGO MOCK, OF NEW YORK, N. Y.

CONFECTIONERY.

1,402,004. Specification of Letters Patent. Patented Jan. 3, 1922.

Application filed December 14, 1920. Serial No. 430,774.

*To all whom it may concern:*

Be it known that I, HUGO MOCK, a citizen of the United States, residing at 930 St. Nicholas Avenue, New York City, in the county of New York and State of New York, have invented certain new and useful Improvements in Confectionery, of which the following is a specification.

This invention relates to improvements in confectionery and more particularly to confectionery having a coffee flavor. A further object of my invention is the production of a confectionery product of a coffee flavor which will be nutritious, of lasting quality and which will also contain in concentrated form, the valuable soluble elements of the coffee bean.

Coffee flavoring is at present used in confectionery in various ways, but has the disadvantage of not being in concentrated form and is liable to lose its strength in the course of time. My improved confectionery product is made as follows:—

I take five parts of ordinary granulated sugar or dextrose very finely powdered. To this, I add one part of dry water-soluble coffee extract which is obtained by leaching pulverized coffee at a temperature below 200° F. and evaporating the solution in vacuo. To the sugar and dry powdered coffee extract above specified, I add one-half portion of neutral, edible fat, containing a minimum of moisture and can use for this purpose butter fat which has been treated to remove the water content or other neutral moisture-free fat. The above mixture of coffee extract, sugar and fat is carefully mixed and ground in the absence of moisture and then molded by pressure into any convenient shape.

After moulding, the product should be quickly covered with a protective layer of sugar coating, preferably somewhat glazed and hardened on the outside so as to prevent the access of moisture to the coffee flavored interior.

The product in the form of tablets, cones or otherwise, is then wrapped in tin foil so as to indefinitely preserve the same. In this way, is obtained a product having a decided coffee flavor of keeping qualities, and of pleasant taste.

What I claim is:—

1. A confection containing sugar and a neutral, edible fat and dry water-soluble coffee extract.

2. A confection having the following ingredients: dextrose, butter fat and dry water-soluble coffee extract.

3. A confection comprising sugar, dry water-soluble coffee extract and a neutral fat and an exterior coating of sugar completely enveloping the same.

4. A confection having the following ingredients:—sugar, butter fat, water-soluble coffee extract and having a hard protective coating of dextrose.

5. A confection comprising five parts of sugar, one part of water soluble coffee extract and one-half part of a neutral fat.

In testimony whereof I hereunto affix my signature.

HUGO MOCK.